Sept. 8, 1970 J. KOK 3,527,892

AUTOMATIC ALARM TRANSMITTING SYSTEM

Filed March 23, 1967 6 Sheets-Sheet 1

INVENTOR
JURGEN KOK
BY
Weingarten Orenbuch & Lahive
ATTORNEYS

INVENTOR
JURGEN KOK
BY
Weingarten Orenbuch & Lahive
ATTORNEYS

INVENTOR
JURGEN KOK
BY
Weingarten Orenbuch & Lahive
ATTORNEYS

INVENTOR
JURGEN KOK
BY
Weingarten Orenbuch & Lahive
ATTORNEYS

INVENTOR
JURGEN KOK
BY
Weingarten Orenbuch & Lahive
ATTORNEYS

Sept. 8, 1970 J. KOK 3,527,892

AUTOMATIC ALARM TRANSMITTING SYSTEM

Filed March 23, 1967 6 Sheets-Sheet 6

INVENTOR
JURGEN KOK
BY
Weingarten Orenbuch & Lahive
ATTORNEYS

United States Patent Office 3,527,892

Patented Sept. 8, 1970

3,527,892

AUTOMATIC ALARM TRANSMITTING SYSTEM

Jurgen Kok, Bedford, Mass., assignor to DASA Corporation, Andover, Mass., a corporation of Massachusetts

Filed Mar. 23, 1967, Ser. No. 625,430
Int. Cl. H04m *11/04*
U.S. Cl. 179—5 17 Claims

ABSTRACT OF THE DISCLOSURE

An alarm system for automatically transmitting information of the existence of an emergency to remote locations by telephone. The automatic alarm system, upon the occurrence of an emergency event, disconnects the local telephone, seizes the telephone line, responds to dial tone signals to make connection with a preselected station, responds to a control signal from the called station to send an emergency message, and then restores the local telephone to normal operability in response to a second control signal from the called station.

FIELD OF THE INVENTION

This invention relates in general to alarm systems for transmitting information over telephone lines and more particularly pertains to apparatus for automatically making an emergency telephone call upon the occurrence of an event.

DISCUSSION OF THE PRIOR ART

The telephone has, from its inception, been recognized as a prime means for the transmission of emergency messages. However, instances are numerous in which emergencies have arisen where no one was present to make the appropriate telephone call or where the people present did not, for various reasons, act to summon aid. To reduce the occurrence of these instances, a practical method of automatic emergency notification is necessary. Many devices are available for detecting fires, flooding, unauthorized entry, burglary, etc., but none of these have widespread practical value for automatically conveying knowledge of the emergency to remote locations where assistance can be obtained.

It has been proposed to employ a signaling mechanism which responds to a local detector by automatically transmitting an emergency message over conventional telephone lines. For example, an automatic alarm signaling mechanism intended for use with the conventional rotary dial telephone is disclosed in U.S. Pat. No. 2,827,515 granted to F. Zuber. The Zuber patent describes a signal device that is an attachment to a telephone line and operates in accordance with a fixed program after being actuated by an alarm sensor. The local telephone instrument remains connected to the telephone line as before the alarm sensor became energized and the signal device connects itself to the line so that it may directly transmit signals over it. Once the Zuber signal device is actuated, it continues to run cyclically, repeatedly dialing a preset emergency number and sending a prerecorded message, until manually de-energized.

One of the disadvantages of such a device resides in the failure of the device to disconnect the local telephone, with the result that the alarm device may not obtain control of the telephone line. That is, if the local telephone happens to be in use when the alarm device is first actuated, the system cannot fuction as intended because its operation is dependent upon detection of a dial tone which, of course will not occur under such circumstances. Another disadvantage is that when the device does obtain control of the telephone line, the line remains engaged by this type of alarm system until the alarm system is reset manually. This results in the telephone line, after transmission of the emergency message, being engaged for no useful purpose and preventing other messages from being sent or received over that line. Moreover, where the desired connection is made by the alarm system, the system continues to recycle until manually reset so that both the calling station and the called station are engaged and unusable for other purposes until resetting of the alarm system occurs. If the called station is a police or fire station, one emergency line becomes unusable for other emergencies for each alarm system that is actuated and remains unusable until the alarm system is reset. The effects of such a cyclically operating system on personnel at the called station and the dangers to the community when such emergency communication lines are tied up are obvious.

SUMMARY OF THE INVENTION

The principal objective of this invention is to provide an alarm apparatus for automatically transmitting information of the existence of an emergency to remote locations without rendering emergency telephone lines unusable for an inordinate period of time and without unduly disrupting normal telephone service. To obtain that objective the automatic alarm system of the invention, upon the occurrence of an emergency event, disconnects the local instrument, seizes the telephone line, responds to operational signals produced in the telephone system to make connection with a preselected station, responds to control signals generated by the called station to send an emergency message, and then restores the local telephone instrument to a condition of normal operability.

The invention resides in an automatic telephone alarm system which seizes an associated telephone line in response to a local emergency detector and which is operationally responsive to external signals received over the line. The system, once actuated, disconnects the local telephone instrument, whether or not the latter happens to be in use, and, after a predetermined delay period, connects an automatic dialer and message generator to the telephone line. When a dial tone is received from the central exchange, the automatic dialer is actuated to produce a predetermined telephone call signal. If an operational signal, such as a busy signal, is received, the system detects that signal and immediately disconnects itself for a period of time and then reconnects itself to the line to again generate the call signal on detection of a dial tone. If, on the other hand, no operational signal is received, the system waits for a predetermined period of time to allow the called station to "answer." The called station answers by transmitting a "start message" signal to indicate that the called station is ready to receive the message. When the "start message" signal is received at the alarm system, a message generator is actuated and an emergency message is sent over the telephone line directly to the called station. The message generator repeats the message until a "stop message" signal is transmitted by the called station. On receipt of such a signal, the local telephone is restored to normal operation and the alarm system is locked out of operation until it is reset by external means, as for example, manually or by actuation of another emergency detector. Where the called station fails to transmit a "stop message" signal, the alarm apparatus, after an interval of time, severs the connection and commences to repeat the entire sequence of operations.

A better understanding of the invention may be gained from consideration of the following detailed description when read in conjunction with the accompanying drawing. It is intended that the drawings, which depict a preferred embodiment, be illustrative of the manner in which the invention can be constructed and that the preferred embodiment not be construed as defining the limits of the invention.

DESCRIPTION OF THE PREFERRED EMBODIMENTS

Figure 1:
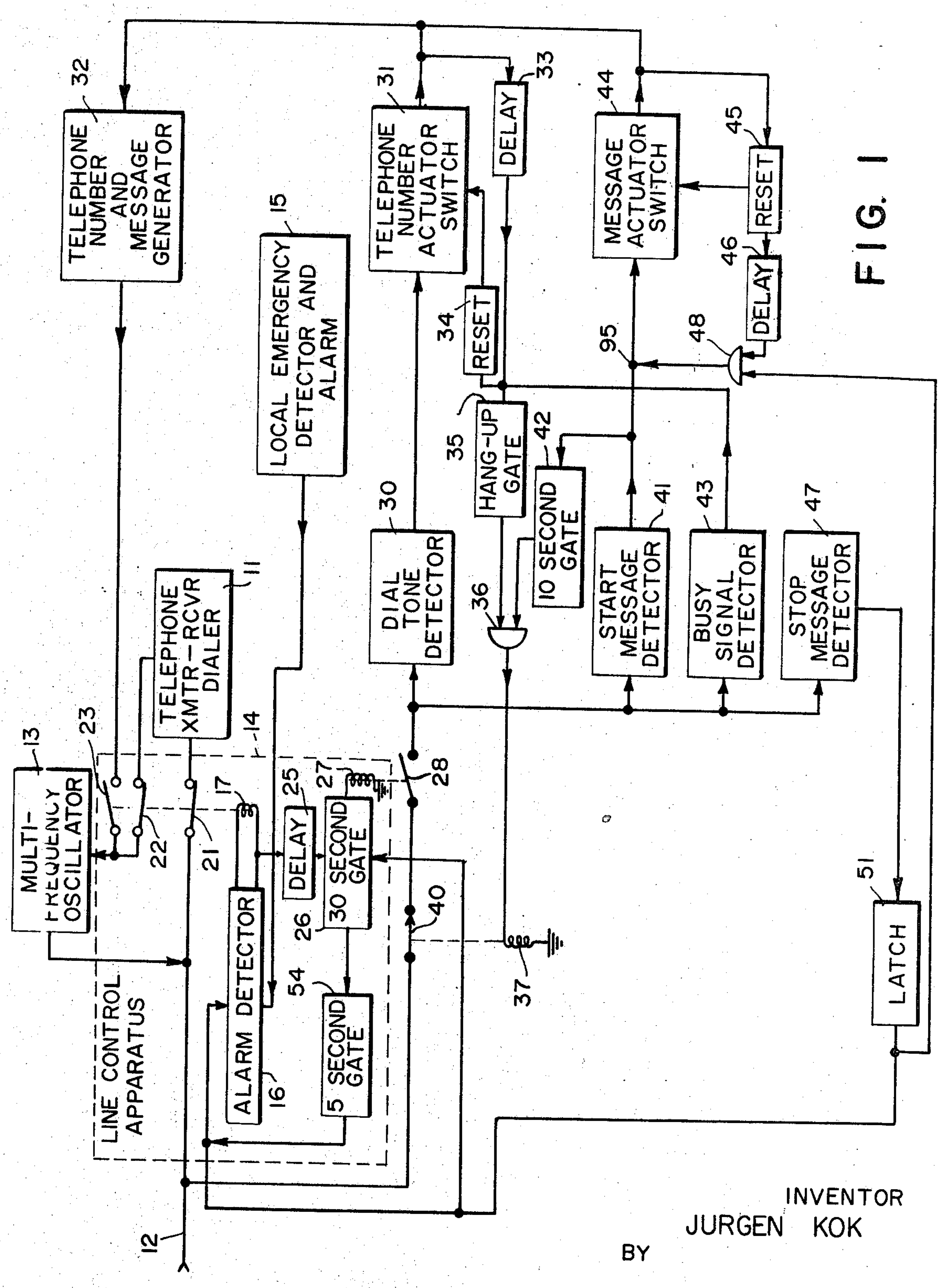
FIG. 1 shows the scheme of an automatic telephone alarm transmitting system embodying the invention.

Before the detailed explanation of the drawing is undertaken, it should be borne in mind that although the drawings illustrate the invention as it is implemented for use with a multi-frequency telephone dialing system, the concept of the invention is also applicable to a dial pulse telephone dialing system, and may be used with either system, with or without a repertory dialer.

Referring now to the drawings, FIG. 1 shows a telephone transmitter-receiver-dialer 11 connected to telephone line 12 and to a multi-frequency oscillator 13 of the type disclosed in U.S. Pat. No. 3,184,554 to L. A. Meacham et al. Line control apparatus 14, diagrammatically indicated in dashed outline in FIG. 1, acts to automatically disconnect telephone 11 and connect oscillator 13 and the various components of the invention to line 12 when local emergency sensor 15 is energized. That is, line control apparatus 14 in effect sequentially opens and then closes the telephone line. The local emergency sensor, indicated by block 15, is not, per se, a part of this invention, and that device can be any known sensor for detecting the type of emergency to be monitored. Whatever type of sensor 15 is used, its actuation causes an alarm detector 16 to energize the winding 17 of a relay having normally closed contacts 21 and 22 and normally open contact 23. When the contacts are moved from their normal positions by energization of the relay's winding, the telephone instrument 11 is disconnected from line 12 and control of oscillator 13 is transferred to the telephone number and message generator 32. Oscillator 13 is thereby prevented from responding to operation of the dialer in instrument 11 while permitting it to be controlled directly by generator 32 of the alarm system.

Alarm detector 16, when it energizes relay winding 17, also energizes a delay circuit 25 which has its output connected to a gate 26. The time period of delay circuit 25 ensures that the telephone central exchange (not shown) is in condition to receive dialing signals over line 12. A period of three seconds has generally been found to be adequate for this purpose, even where line 12 is in use when the alarm system is energized. It should be noted that where a call originates from telephone dialer 11 (viz, an outgoing call), the connection can be broken (i.e., the center exchange can be released) by opening the contact 21 of relay 17. However, where the call in progress is an incoming call (viz, where the call originated at some other station), the calling party must break the connection in order to release line 12 for outgoing calls. Where the call in progress is an outgoing call at the time sensor 15 is actuated, the delayed switching arrangement of line control apparatus 14, by opening and closing the connection to line 12, causes the central exchange to disconnect and to then place the local station in condition to transmit another call. At the end of the three second delay, a signal from delay unit 25 causes gate 26 to emit a signal for an interval which, under normal operating conditions, permits an emergency message to be transmitted and an acknowledgment to be received. An interval of thirty seconds has been found to be adequate, and gate 26 is therefore referred to as a thirty-second gate. Upon reception of a signal from the output of delay unit 25, gate 26 emits a gating signal that energizes the winding of relay 27 for a period of thirty seconds. Relay 27 has a normally open contact 28 which upon being closed completes a circuit between line 12 and the input of the alarm system. In ordinary circumstances, the closure of relay contact 28 is quickly followed by receipt of a dial tone, which is sensed by dial tone detector 30.

Dial tone detector 30 (which may be a simple tuned parallel inductance-capacitance circuit with a rectifier) upon receiving a dial tone, emits a trigger pulse to telephone number actuator switch 31. The actuator switch then responds to the trigger pulse by producing a train of pulses which energize telephone number and message generator 32. The signals emitted by generator 32 determine the tones that are produced by multi-frequency oscillator 13 and thereby determine the telephone signals that are transmitted into line 12. The final pulse in the train produced by number actuator switch 31 actuates delay circuit 33, which is here taken to have a five-second duration. If the called station does not answer with a "start message" signal before the end of the five-second period, recycling of the telephone number generation apparatus occurs. Upon the elapse of the five second period, delay circuit 33 emits a signal to reset circuit 34 which thereupon resets actuator switch 31 to emit another pulse train upon reception of a trigger signal from dial tone detector 30. The signal from delay circuit 33 is also impressed upon the input of a hang-up gate 35 which furnishes one of the inputs of AND gate 36. Upon receiving a signal from delay circuit 33, gate 35 emits an enabling signal of approximately five seconds duration to the AND gate 36. Where the other input to AND gate 36 is also enabled, the AND gate 36 permits the gating signal from hang-up gate 35 to energize the winding of relay 37. Energization of that relay's winding causes normally closed contact 40 to open and sever the connection to telephone line 12. That "hanging-up" operation allows the central exchange to again prepare to receive dialing signals over line 12. Upon delay of the five second enabling signal emitted by gate 35, the winding of relay 37 is de-energized and contact 40 returns to its normally closed position. The closing of contact 40 re-establishes the connection to line 12 and permits the dial tone, evidencing the readiness of the central exchange to accept dialing signals, to again be received. The dial tone detector 30, upon detecting the dial tone, emits its trigger signal to telephone number actuator switch 31 and the telephone number and message generator 32 again causes oscillator 13 to transmit the predetermined telephone call signals into line 12.

If, within the five-second period of delay circuit 33, the called station answers by transmitting a "start message" signal, detector 41 responds to the start message signal by immediately inhibiting AND gate 36 through ten-second gate 42. Gate 42 normally emits an enabling signal to AND gate 36. On receiving a signal from detector 41, gate 42 ceases to emit its enabling signal for a period of ten seconds and thereby causes gate 36 to be inhibited for an interval equal to the combined periods of delay circuit 33 and hang-up gate 35. When AND gate 36 is inhibited, the signal emitted by hang-up gate 35 in response to the trigger from delay circuit 33 has no effect upon relay 37 because gate 36 does not allow that signal to pass. The signal from delay circuit 33, however, does energize reset circuit 34 as before so that telephone number actuator switch 31 is again conditioned to generate the pulse train. The gate 42 prevents relay 37 from being energized after the called station has answered and the full ten second interval furnished by that gate is required in instances where the called station answers immediately after the number has been dialed.

In the circumstance where the called station is already engaged, a conventional "busy" signal, generated by the central exchange, is transmitted over line 12. The busy signal is detected by busy signal detector 43 (which may also be a tuned circuit similar to dial tone detector 30) and that detector then immediately emits a trigger signal to hang-up gate 35. The hang-up gate 35 thereupon emits its five second enabling signal to AND gate 36 and recycling of the apparatus occurs without waiting for the period of delay circuit 33 to expire. Delay circuit 33, in its normal course, causes reset circuit 34 to reset actuator switch 31 before a new dial tone is received.

To facilitate detection of the "start message" signal by detector 41, the "start message" signal may simply be a predetermined frequency or tone to which detector 41 is tuned. Thus, detector 41 can be a circuit that is resonant to electrical signals of a predetermined frequency or a reed that vibrates to a predetermined tone. Detector 41, in response to the start message signal, emits a trigger pulse which in addition to energizing gate 42 also is impressed upon message actuator switch 44. Message actuator switch 44, in response to the trigger pulse from detector 41, emits a train of pulses which energize telephone number and message generator 32. Generator 32, in response to the pulse train, causes oscillator 13 to transmit a predetermined series of tones into line 12. At the called station a receiver decodes the tones to determine the message. The message may, for example, be composed of tones that identify the calling station and the nature of the emergency. If desired, each tone can be coded to correspond to a numerical digit in the manner now used in tone signal dialing systems. The final pulse of the train produced by message actuator switch 44 energizes reset circuit 45 which acts to condition message actuator switch 44 to again generate a train of pulses. Reset circuit 45 simultaneously actuates one-second delay device 46 and that device, after the elapse of one second, emits a start pulse which passes through normally enabled AND gate 48 to message actuator switch 44 to cause a pulse train to again be emitted to message generator 32. This cyclical process continues until the called station acknowledges receipt of the message by transmitting a "stop message" signal. Receipt of the stop message signal by detector 47 causes latch 51 to emit a signal which disables alarm detector 16, de-energizes thirty-second gate 26 and inhibits AND gate 48. To facilitate the action originating with detector 47, the stop message signal may be designed to have characteristics similar to those of the start message signal and detector 47 may be of a type similar to detector 41.

Upon disablement of detector 16 the winding of relay 17 becomes de-energized causing contacts 21, 22 and 23 to return to their normal positions in which contact 23 is open and contacts 21 and 22 are closed, whereby the local telephone and dialer are returned to normal operation. When thirty-second gate 26 is de-energized by the signal from latch 51, the winding of relay 27 is consequently de-energized and contact 28 opens, disconnecting the alarm system from line 12. By inhibiting AND gate 48, latch 51 effectively prevents message actuator switch from indefinitely recycling within the alarm system. Whenever AND gate 48 is enabled, a single energization signal from start message detector 41 causes message actuator switch 44 to become part of a free-running closed loop of switch 44, reset circuit 45 and delay device 46. The signal from latch 51 which inhibits AND gate 48 effectively interrupts this continuous cycle operation, whereby a new signal from detector 41 is necessary to again energize switch 44. Latch 51 remains in its latched position until it is unlatched and while latched, the telephone and dialer can be operated normally. Until latch 51 is manually unlatched or is automatically unlatched by the actuation of some other sensor for dedetecting emergencies, the alarm system remains disabled. Thus, where the system has a sensor for detecting unauthorized entry and another sensor for detecting fire, actuation of the unauthorized entry sensor can cause the system to transmit an alarm and then be disabled by latch 51. The subsequent actuation of the fire sensor then can cause the latch to be reset to enable the system to transmit another emergency message.

If a stop message signal is not received before the thirty-second gating period of gate 26 expires, gate 54, at the end of the thirty-second period, emits a signal which diables alarm detector 16 for five seconds. Disabling of the alarm detector permits the system to return to its initial condition. At the end of the five second period, the line control apparatus 14 is again actuated if the local emergency sensor still detects an emergency and operation of the alarm system is then repeated for another thirty seconds, or until the called station sends a stop message signal. Thus, this system allows for any malfunctions in the central exchange or in the dialing apparatus which may not be repeated on a second or subsequent cycles, because unless a proper dial tone signal, start message and stop message signals are sequentially received, the alarm transmission system will continue to recycle as previously described. If, however, proper signals are received in the proper sequence, the system transmits an emergency message and then releases the telephone line for normal use.

Figures 2, 3:
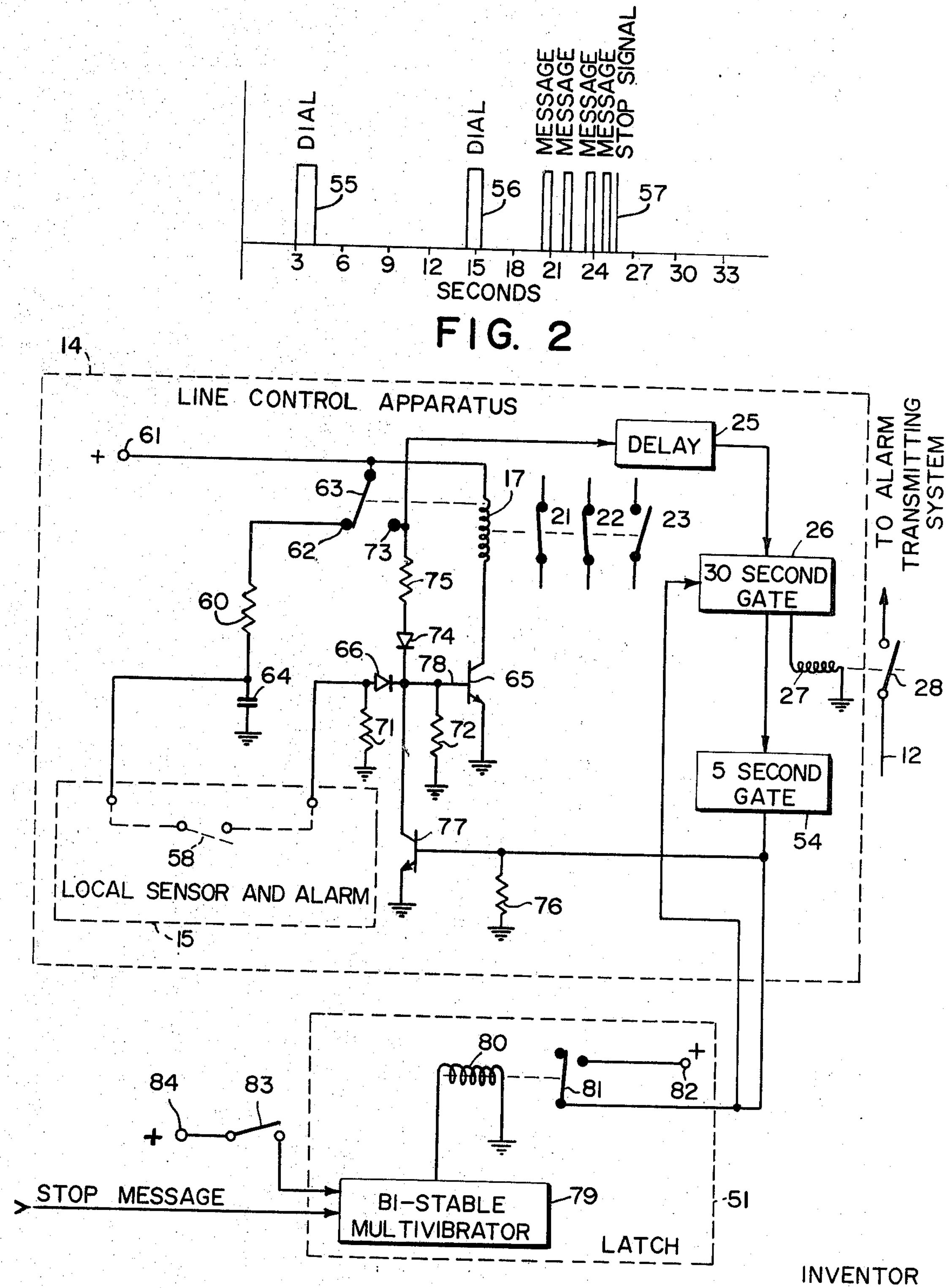
FIG. 2 is a timing diagram relating to the sequence of the operations of the system shown in FIG. 1.
FIG. 3 depicts details of the circuitry in the line control apparatus of FIG. 1.

FIG. 2 is a time chart showing the relationship of signals occurring during a typical cycle of operation of the invention. Assuming that the cycle commences at time zero with the actuation of alarm detector 16, gate 26 in line control apparatus 14 causes contact 28 to close three seconds later and connect the alarm system to telephone line 12. Assuming a dial tone is present when that connection is made, the system immediately dials out the emergency telephone number during the interval represented by block 55. If the called station does not answer within five seconds, the system causes the connection to be broken by relay 37 and to be re-established five seconds later. Assuming a dial tone is again present upon re-establishment of the connection, the telephone number is again dialed out by the system during the interval represented by block 56. Assuming that the called station now answers within five seconds by transmitting a "start message" signal, the emergency message is immediately transmitted by the system and is repetitively transmitted with one second intervals between messages as indicated on the timing diagram. After the fourth transmission of the emergency message, the called station transmits a "stop message" signal 57 and the apparatus thereafter is "latched" and can not transmit more emergency messages until the apparatus is unlatched. If the called station had not transmitted a "stop message" signal, the apparatus would continue to send out emergency messages until the thirty-third second. Thereafter, the apparatus would recycle and commence another sequence of operation by breaking the connection to the called station.

Turning now to FIG. 3, the circuit details of line control apparatus 14 and latch 51 are shown. The local emergency sensor 15 may be a conventional fire or burglary detection device that is arranged to cause switch 58 to close upon detection of an emergency. In the initial condition of the system, the winding of relay 17 is not energized and the contacts are in their normal positions with contact 23 open and contacts 21 and 22 closed. Relay 17 also has a contact 63 which normally is at station 62. When contact 63 is at that station, the positive voltage at terminal 61 charges capacitor 64 through resistor 60. When local sensor 15 detects an emergency, switch 58 closes and applies the voltage across capacitor 64 to the base of transistor 65. When switch 58 is open, transistor 65 is unbiased and is therefore non-conducting. The application of the capacitor's voltage to the base of the transistor causes the transistor to conduct a current which energizes the winding of relay 17. In actuality, capacitor 64 provides a bias for transistor 65 by discharging through a path that includes switch 58, diode 66, transistor 65, and resistors 71 and 72. With transistor 65 conducting, an electrical circuit is completed from point 61 through relay 17 and through transistor 65 to ground. Energization of the winding of relay 17 causes contacts 21, 22 and 23 to operate in the manner previously described. Energization of that relay's winding also causes contact 63 to be drawn to station 73, whereupon a biasing signal, that is not dependent upon the charge in capacitor 64, is impressed upon the base of transistor 65 and holds that transistor in the conductive state. When contact 63 is at station 73, diode 74 becomes conductive and permits current to flow through a resistor 75. The movement of contact 63 to station 73 also actuates delay circuit 25, which after a three second delay triggers thirty-second gate 26. Upon being triggered, gate 26 emits an energizing signal of 30 seconds duration to the winding of relay 27. Normally open contact 28, upon energization of relay 27, closes and connects the alarm transmitting system to line 12. At the termination of the thirty second energizing signal from gate 26, contact 28 opens and the five-second gate 54 is triggered by the trailing edge of the signal from gate 26. The signal from five-second gate 54 induces a potential drop across resistor 76 which causes transistor 77 to conduct. When transistor 77 conducts, the base electrode 78 of transistor 65 is effectively grounded and causes transistor 65 to be cut off. With transistor 65 cut off, the current in the winding of relay 17 ceases to flow and contacts 21, 22, 23 and 63 return to their normal positions. A circuit is then completed to ground from biasing point 61 through contactor 63, contact 58 (contact 58 remains closed until local alarm 15 is reset), diode 66 and transistor 77 which holds transistor 65 cut off. After a five second period, the signal from gate 54 ends and transistor 77 thereupon becomes non-conductive. With transistor 77 cut off, transistor 65 is biased into conduction, causing relay 17 to be again energized and recycle the operation of the line control apparatus.

If, within the thirty second period during which gate 26 maintains the system connected to line 12, the message has been received and acknowledged by a stop message signal from the called station, stop message detector 47 actuates a bi-stable multivibrator 79, located in latch 51, causing the multivibrator to change its state and actuate relay 80. Actuation of relay 80 causes the positive voltage at terminal 82 to be applied through contactor 81 to the base of transistor 77 and holds that transistor in conduction. In that circumstance, the alarm transmitting system is disconnected from line 12 and bcause multivibrator 79 is a bi-stable device, the alarm system remains in that condition until latch 51 is reset. Latch 51 may be unlatched by manually closing a switch 83 which thereupon resets multivibrator 79 to its initial state by applying the positive voltage of terminal 84 to the reset input of the multivibrator. Upon resetting of the multivibrator, relay 80 is deenergized, causing contactor 81 to return to its normal position and remove the forward bias from transistor 77.

Figure 4:
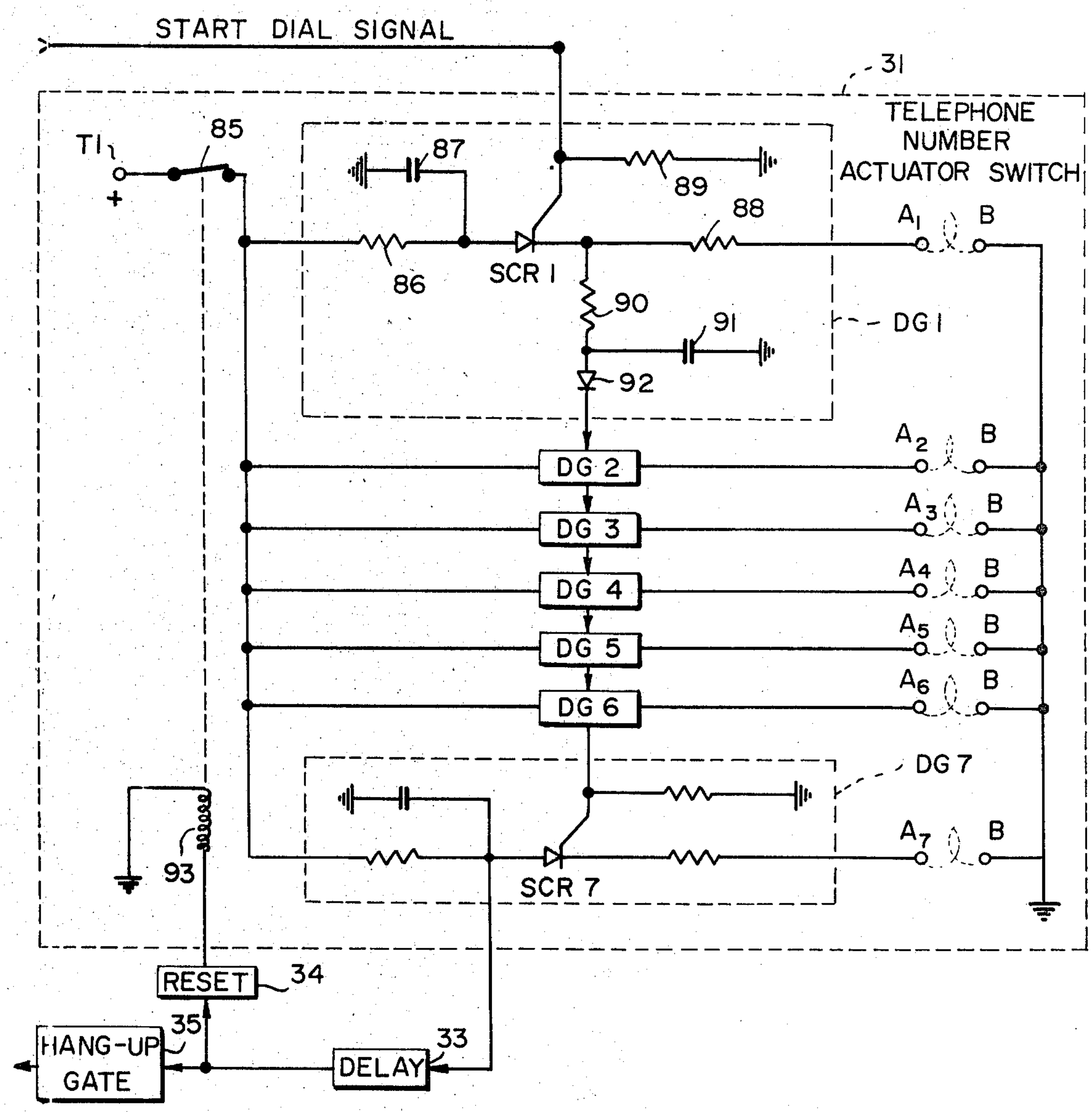
FIG. 4 is an illustration partly in block diagrammatic and partly in schematic form of a preferred embodiment of the telephone number actuator switch of FIG. 1.

FIG. 4 depicts, in detail, a preferred embodiment of telephone number actuator switch 31. Individual digit switches DG1, DG2 . . . DG7 are arranged to be sequentially rendered conducting at one hundred millisecond intervals in response to an initial trigger signal from the dial tone detector 30 (FIG. 1). Each individual digit switch comprises a silicon controlled rectifier (SCR) having its anode connected to a source of positive voltage at terminal T1 through a normally closed contact 85 and a current limiting resistor 86. With the SCR not conducting, the capacitor 87 charges to the voltage of the source. The cathode of the SCR is connected: (a) through an isolating resistor 88 and primary coil A1–B to ground; and (b) through a delay circuit consisting of resistor 90, capacitor 91 and diode 92 to the control electrode of SCR2 in digit switch DG2. The signal emitted by dial tone detector 30 of FIG. 1 is applied to resistor 89 and to the gate of SCR1 causing the SCR to become conductive. Capacitor 87 thereupon commences to discharge through SCR1, causing a current flow in input coil A1–B. When the voltage across capacitor 87 drops to the level of the voltage at the low end of current limiting resistor 86, conduction of SCR1 is maintained by the current from terminal T1 which flows through resistor 86. Capacitor 91, consequently, charges, through resistor 90, toward the voltage at the cathode of SCR1. When the threshold voltage of diode 92 is reached, that element conducts and causes the voltage across capacitor 91 to be impressed on the gate of SCR2, thereby causing SCR2 to "fire" (viz, to become conductive). Resistor 90, capacitor 91 and diode 92 are chosen to cause SCR2 to be fired one hundred milliseconds after SCR1 is fired so that a proper interval between generated telephone dial digit signals is maintained. When SCR2 bcomes conductive a current passes through input coil A2–B. The described operation continues until the last digit switch, DG7 in the illustrated case, has been fired.

Firing of the last digit switch DG7 initiates operation of delay circuit 33, which may, for example, be a monostable multivibrator having a five-second astable period. At the end of such period, reset circuit 34 and hang-up gate 35 (both of which may also be monostable multivibrators) are triggered by delay mechanism 33. Reset circuit 34 in turn momentarily energizes relay 93 which causes contact 85 to move its off-normal position and remove the positive voltage from the anode of each SCR. Upon removal of the positive voltage, the SCR's extinguish and return to their non-conducting state. The return of contact 85 to its normal position conditions telephone number actuator switch 31 to operate again on receipt of a signal from dial tone detector 30. The telephone number actuator switch 31 is not limited to seven digits as it is obvious that the number of individual digit switches can be increased or decreased to correspond with the number of digits in the telephone number to be called by the alarm system upon the occurrence of the emergency event.

Figure 5:
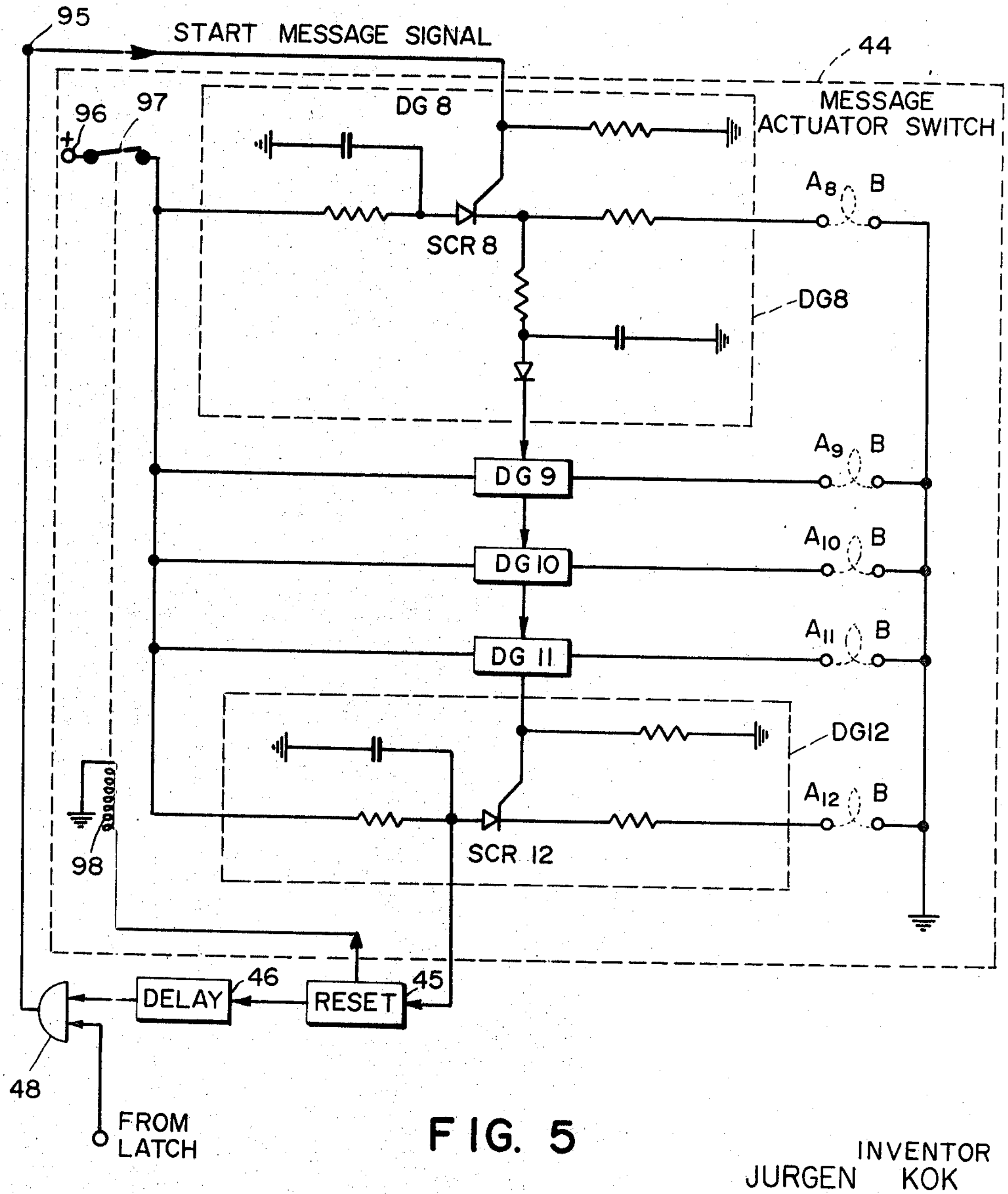
FIG. 5 is a diagram similar to that of FIG. 4 showing a preferred embodiment of the message actuator switch of FIG. 1.

Apparatus suitable for use as the message actuator switch 44 of FIG. 1 is shown in FIG. 5. That apparatus in similar in construction and in operation to the telephone number generator actuator switch previously described. The emergency message may be simply a number of digits that identify the calling station and the nature of the emergency; five digits are generally adequate for those purposes. For example, the first four digits may be a number assigned to the calling station and the fifth digit may identify the nature of the emergency. Where the fifth digit is 1, the emergency may be a fire, 2 may signify a burglary, 3 may signify a breakdown of refrigeration apparatus, 4 may signify inactivation of air conditioning equipment, and so on. In FIG. 5, the signal emitted by the start message detector 41 (FIG. 1) appears at terminal 95. The message actuator switch has five individual digit switches, DG8, DG9 . . . DG12, arranged to be sequentially energized at 100 millisecond intervals to cause currents to flow in the coils A8–B, A9–B . . . A12–B. The final digit switch DG12, upon being actuated, triggers reset circuit 45 and the reset circuit triggers delay circuit 46. Reset circuit 45 is triggered when SCR12 fires in digit switch DG12 and the reset circuit 45 then energizes relay 98, causing contact 97 to move to its off-normal position. Upon the opening of contact 97, digit switches DG8 through DG12 are reset to their initial condition. The delay introduced by circuit 46 preferably is in the order of one second, after which time delay circuit 46 applies a signal to point 95 which causes message actuator switch 44 to repeat its cycle. The message is repeatedly sent until a stop message signal is received, as previously described.

Figure 6:
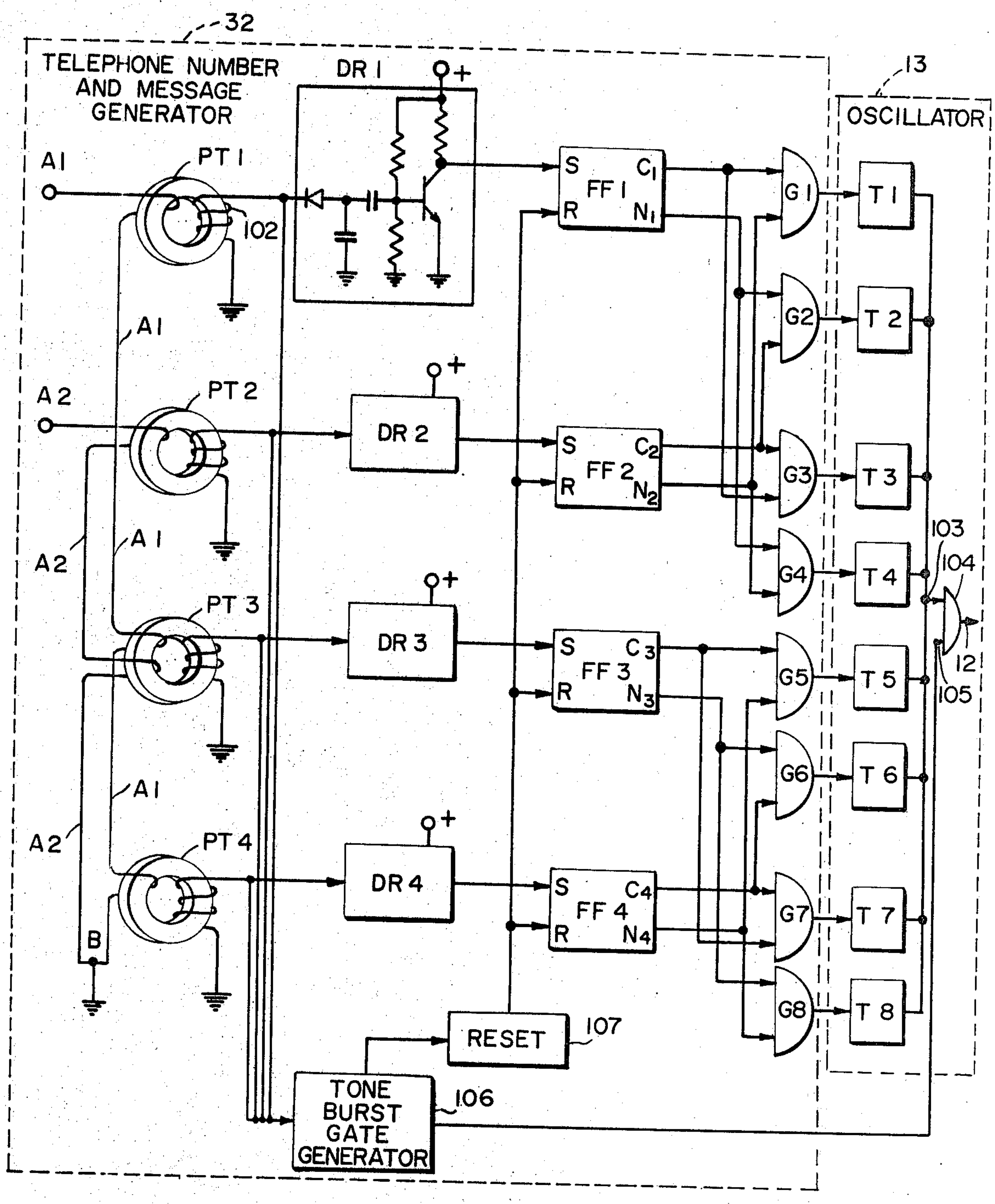
FIG. 6 shows the electrical circuitry for the telephone number and message generator of the invention.

A telephone number and message generator (box 32 of FIG. 1) suitable for use in the alarm system and part of oscillator 13 are shown diagrammatically in FIG. 6. The telephone number and message generator employs four pulse transformers PT1 through PT4 whose input windings are the coils A1–B . . . A7–B of the telephone number actuator switch in FIG. 4 and the coils

A8–B . . . A12–B of the message actuator switch in FIG. 5. Input coil A1–B is, for purposes of exposition, coupled with pulse transformers PT1, PT3 and PT4. When that input coil is energized by a current, voltages are induced in the output windings of transformers PT1, PT3, and PT4. No voltage, however, is induced in the winding of transformer PT2 because input coil A1–B is not coupled to that transformer. In the parlance of binary numerics, an induced voltage is here considered to be a binary ONE and the absence of an induced voltage is considered to be a binary ZERO. Considering the output of transformer PT1 to be the least significant binary bit and the output of the other transformers to be, in their sequence, of progressively higher binary significance, the binary code represented by the outputs of transformers PT1, PT2, PT3, and PT4, when input coil A1–B is initially energized by a current, is 1011. The binary code 1011 may arbitrarily represent any desired decimal digit and is here selected to represent the decimal 9.

Input coil A2–B is shown in FIG. 6 to be coupled to transformers PT2 and PT3. Upon energization of input coil A2–B, voltages are induced in the output windings of transformers PT2 and PT3. The binary code represented by outputs of the four transformers is, therefore, 0110, which is here selected to represent the decimal 5.

Each of the input coils A1–B, A2–B . . . A12–B, is capable of generating a four bit binary code at the output of pulse transformers PT1 to PT4.

When digit switch DG1 in the telephone number actuator switch of FIG. 4 is fired, a current commences to flow in coil A1–B causing induced voltage pulses to occur at the outputs of pulse transformers PT1, PT3, and PT4. When the current in coil A1–B reaches a steady state, the induced voltage pulses decay. It is known that a 100 millisecond interval is sufficient time for that action to occur in the pulse transformers. Thus, by sequentially actuating the individual digit switches DG1 to DG7 in the telephone number actuator of FIG. 4, a succession of seven four-bit binary codes are produced at the outputs of the pulse transformers PT1 to PT4 in the generator of FIG. 6.

Similarly, when the digit switches DG8 to DG12 in the message number actuator switch of FIG. 5 are fired in sequence, a succession of five four-bit binary codes are produced at the outputs of the pulse transformers in the generator of FIG. 6.

The output winding of each pulse transformer in the generator of FIG. 6 is connected by a driver to the set (S) input of a bistable device here termed a "flip-flop." The output winding 102 of pulse transformer PT1, for example, is connected by driver DR1 to the set input of flop-flop FF1. The drivers DR1 . . . DR4 are devices which respond to an induced voltage in its associated transformer output winding by delivering a signal that "sets" the flip-flop to which the driver is connected. Such "drivers" are well known in the technology of electronics and are not here described in detail because adequate descriptions are available in the technical literature.

In the initial condition of the apparatus, all the flip-flops FF1 to FF4 are in the "reset" state. The "reset" state is that state in which the flip-flop emits an enabling signal at its complementary (C) output and emits a disabling signal at its normal (N) output. An enabling signal signifies a signal that acts to uninhibit a gate and is here termed a binary ONE signal. A disabling signal (which may simply be the absence of a voltage) signifies a signal that inhibits the gate and is here termed a binary ZERO signal. AND gates G1 through G4 constitute a decoder and are coupled from flip-flops FF1 and FF2 to respective frequency generators T1 through T4 so that one and only one of the latter may be energized at any one time. Similarly, gates G5 through G8 are coupled from flip-flops FF3 and FF4 to respective frequency generators T5 through T8. That arrangement permits one of the frequency generators T1–T4 and one of the frequency generators T5–T8 to be energized at the same time and the two frequencies produce a tone signal that is indicative of a decimal digit of a telephone number.

Coil A1–B of digit generator DG1 is coupled, as previously described, with the proper pulse transformers to generate the binary code identifying the decimal digit 9. Because coil A1–B is coupled to transformer PT1, energization of that coil induces a voltage pulse in output winding 102 which causes driver circuit DR1 to "set" flip-flop FF1. Loop A1–B is not coupled to transformer PT2 and flip-flop FF2 remains in its "reset" state. Similarly, loop A1–B is coupled with and causes a pulse to be produced at the outputs of transformers PT3 and PT4 that "set" flip-flops FF3 and FF4. Thus a ONE output is emitted from the complementary terminals C1, C3, and C4 of the corresponding flip-flops FF1, FF3, and FF4, and a ONE output is emitted from the normal terminal N2 of flip-flop FF2. Gates G1 and G7 are enabled by the flip-flops while all the other gates are inhibited. Gates G1 and G7, upon being enabled, emits signals which cause frequency generators T1 and T7 to be energized and produce a two-frequency tone at input terminal 103 of transmission gate 104. The tone thus generated corresponds to the digit 9 at the telephone central exchange. Similarly, loop A2–B is coupled with transformers PT2 and PT3 and when that loop is energized it causes flip-flops FF2 and FF3 to be set. Gates G2 and G5 are thereby enabled and caused frequency generators T2 and T5 to produce a tone corresponding to the digit 5. To enable gate 104 to transmit the generated tones to line 12, a gate enabling signal must be applied to terminal 105. Tone burst gate generator 106, whose input is connected directly to the secondary of all four transformers, is triggered whenever any one of the pulse transformers emits a pulse. The enabling signal of the tone burst gate generator 106 lasts for 50 milliseconds, thus enabling gate 104 for that period. Because the individual digit switches in the telephone number actuator switch (FIG. 4) and the message actuator switch (FIG. 5) are sequentially activated at 100 millisecond intervals and because the tone burst is only of 50 millisecond duration, gate 104 is cut off before each new binary code is generated by the pulse transformers in FIG. 6. Furthermore, at the end of each tone burst period, gate generator 106 provides a trigger to reset circuit 107 which causes that circuit to reset the flip-flops in preparation for the next tone to be generated. It is apparent that an emergency message of any length could be sent by use of the tone generator of the telephone dialer, dependent only upon the number of individual digit switches in the message actuator switch. It is also to be noted that the telephone number actuator switch of FIG. 4 may be modified to provide more than seven digits for numbers beyond the local area.

Figure 7:
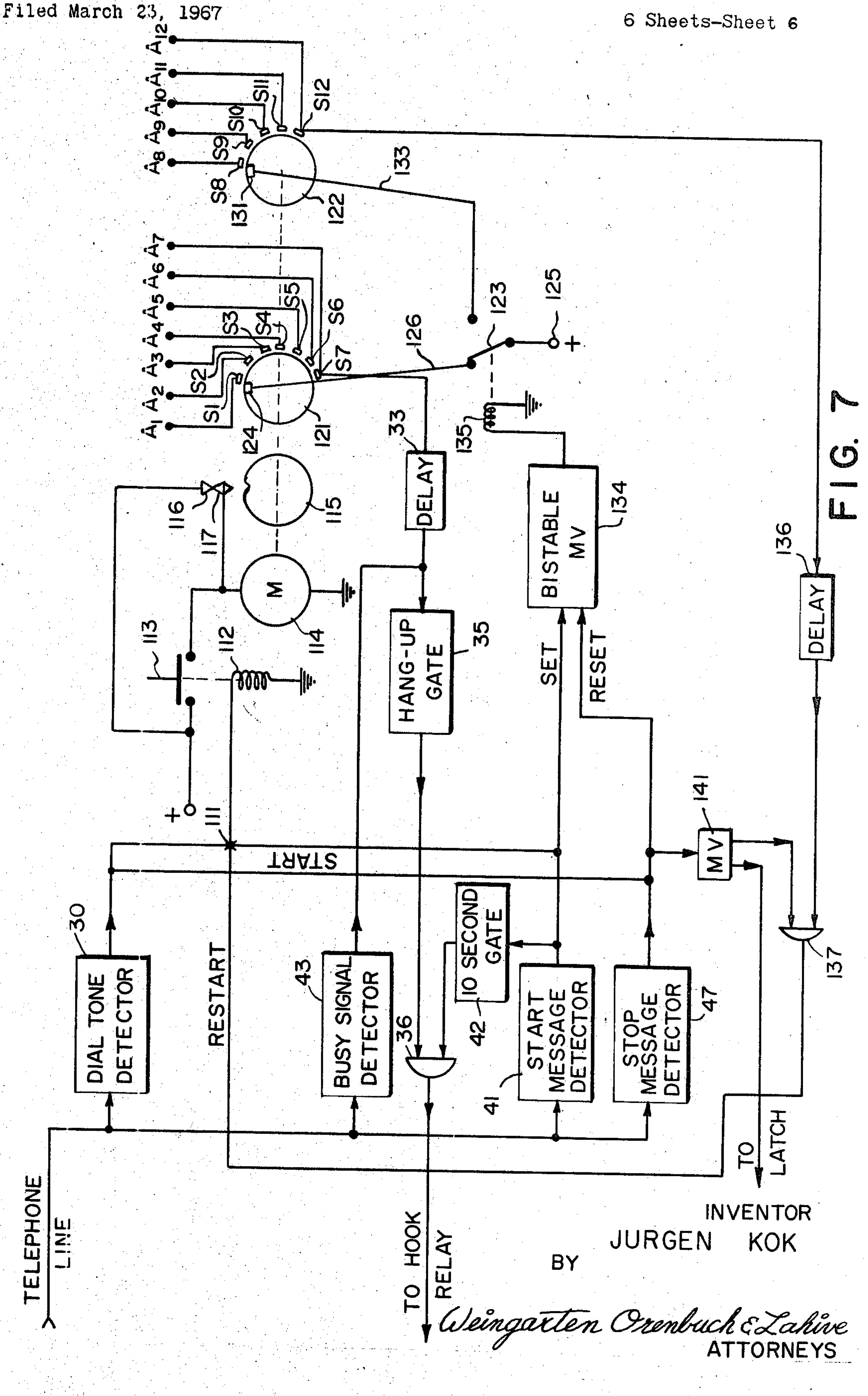
FIG. 7 is a diagram of a second embodiment of telephone number and message actuator switches of FIG. 1.

Alternate embodiments of the actuator switches which are schematically depicted as blocks 31 and 44 in FIG. 1 are shown in FIG. 7 together with electrical circuitry to adapt them to the rest of the alarm transmitting system. The primary difference between the embodiments described above and the alternate embodiments is that the former use electronic digit switches while the latter use motor operated physical contact switches.

Referring to FIG. 7, cam follower 117 is initially in the depression in the perimeter of cam 115 so that there is a gap between contact 116 and the cam follower 117. When a signal is applied at terminal 111, relay 112 is energized and upon closing of contactor 113 electric motor 114 is energized. Cam 115 is driven by the electric motor and upon rotation of the motor's armature, cam 115 forces cam follower 117 into contact with the contactor 116 so that the motor continues to be energized even though relay 112 "drops out." Motor 114 drives two commutators 121 and 122, either of which may be used to produce electrical pulses, depending upon the position of selector switch 123 which acts as an electronic clutch. Commutator 121, which corresponds to telephone number actuator switch 31, has a rotatable arm carrying electrical contact 124 which is connected with a source of power at terminal 125 by lead 126 through switch 123. As the arm of commutator 121 rotates, it successively makes electrical contact with contacts S1 through S7 which cause electrical pulses to occur in transformer input coils A1–B through A7–B as set forth in the description of the embodiment of the actuator switches in FIGS. 4 and 5. The pulse generated by contact S7 also energizes delay circuit 33 and other system elements in the manner previously described in conjunction with the electronic switch 31. Input coils A1–B through A7–B are coupled with the pulse transformers as described in conjunction with FIG. 6. Commutator 122, which corresponds to message actuator switch 44, has a rotatable arm carrying electrical contact 131 which successively makes electrical contact with the contacts S8 through S12, the latter being connected to input coils A8–B through A12–B respectively. The pulse generated at contact S12 provides the recycle pulse needed for repetition of the message. The arm of commutator 122 is connected to a source of power from terminal 125 by means of lead 133 through selector switch 123.

In the operation of this embodiment, when a dial tone is transmitted by the central exchange, dial tone detector 30 produces a start dial pulse at terminal 111 to energize motor 114. To ensure that the telephone number is generated, the start dial signal is also applied to the reset side of bistable multivibrator 134 which energized relay 135 to move selector switch 123 into connection with contact 124 through lead 126. Motor 114 then turns successively connecting input coils A1–B through A7–B to the power source through switch 123. The signal generated through contact S7 actuates delay circuit 33 and in conjunction with the first embodiment, the previously described operations occur.

When the called station is ready to receive the message, the start message signal causes a signal to be emitted by detector 41 as previously described. This signal disables gate 36 through 10-second gate 42, impresses a pulse on terminal 111 to energize motor 114, and sets multivibrator 134. In the "set" position, multivibrator 134 de-energizes relay 135 allowing selector switch 123 to be connected to lead 133, thus providing the message generator commutator 122 with power for energizing the pulse transformer input coils A8–B through A12–B. At completion of the message, delay circuit 136 is energized through contact S12 to provide a delay of approximately one second, whereupon the then occurring signal goes to AND gate 137 which is normally enabled. The delay signal from delay circuit 136 is therefore passed directly to terminal 111, re-energizing motor 114 to regenerate the message. The message is repeatedly generated until the called station sends a stop message signal which actuates stop message detector 47. The signal from detector 47 resets multivibrator 134, causing switch 123 to return to its normal contact with lead 126 to commutator 121. The same signal actuates monostable multivibrator 141 to inhibit gate 137 and to energize the latching circuit shown in FIG. 3. When the alarm system is latched, it cannot be re-energized except by manually unlatching or by the action of a different alarm detector which may be interconnected with the system.

The various well known electrical sub-circuits which are employed within the system of this invention, such as the relays, delay circuits, gating circuits, tuned circuits and multivibrators, have not been described in detail because they are old in the art and their internal construction is not necessary to the concept of this invention. Further, the parameters of these sub-circuits may be modified, some of the circuits may be removed entirely and others added or some may be combined functionally with others.

This invention may, of course, be embodied in a multitude of different configurations. For example, it is not essential to the invention that a busy signal detector be used. Such a detector simply causes immediate recycling of the dialing apparatus and, if a short delay is tolerable, the busy signal detector can be eleminated because recycling, when the called station is busy, will be accomplished by the expiration of the delay period of delay circuit 33. Also, although a single local alarm and a single telephone number actuator switch are described, it is quite feasible to have local sensors react to different conditions such as fire, flooding, unauthorized entry and burglary arranging those sensors to actuate different number actuator switches so that a different number is called for each type of emergency.

Further, it is not necessary that the present invention be limited to transmit messages via a multi-frequency digit dialing system which must be decoded at the called station. For example, the start message signal could be utilized to actuate an ordinary voice recording rather than the illustrated digital message generator. As a matter of fact, it is not necessary that any message be transmitted from the alarm signalling apparatus. That is, once connection is made between the calling station and the called station, the identity of the calling station may be determined by the called station using conventional tracing equipment. In such an arrangement, differentiation between the different types of conditions being monitored would simply be made by arranging the telephone number generator to produce different called station numbers depending upon the particular type of condition actually occurring.

In view of the multitude of ways in which the invention can be embodied, it is not intended that the scope of this invention be restricted to the precise arrangements illustrated in the drawing or described in the exposition. Rather, it is intended that the scope of the invention be delimited by the appended claims and that within that scope be included only those structures which in essence utilize the invention.

What is claimed is:

1. An automatic alarm signaling system comprising:

(a) a sensor for detecting the occurrence of an emergency event, (b) means responsive to actuation of the sensor for connecting the alarm signaling system to a telephone line, (c) a generator for producing telephone station calling signals, (d) a generator for producing emergency message signals, (e) means responsive to the reception of a dial tone for causing telephone station calling signals to be transmitted into the telephone line, (f) means responsive to a first signal transmitted by the called station for actuating the emergency message signal generator, and (g) disconnecting means responsive to a second signal transmitted by the called station to disconnect the alarm signaling system from the telephone line.

2. An automatic alarm system according to claim 1, further including:

(h) a latch in the disconnecting means, the latch acting to prevent the alarm system from again being connected to the telephone line until the disconnecting means is unlatched.

3. An automatic alarm system according to claim 1, further including:

(i) means responsive to a reception of a "busy" signal for causing the alarm system to disconnect and then reestablish the connection to the telephone line.

4. An automatic alarm system according to claim 1, further including:

(j) a first switching means, responsive to the actuation of the emergency event sensor, for seizing the telephone line and disconnecting therefrom the local telephone.

5. An automatic alarm system according to claim 4, further including:

(k) timing means responsive to actuation of the sensor for causing the connecting means to connect the alarm system to the telephone line for a fixed interval of time, the timing means causing the connecting means to periodically re-establish connection to the telephone line until both the first and the second signals are received from the called station within the fixed interval of time.

6. An automatic alarm system according to claim 1, further including:

(l) a numeral signal generator, wherein:

the emergency message signal generator actuates the numeral signal generator to produce coded alarm messages.

7. An automatic alarm system according to claim 1, wherein:

the sensor is capable of detecting various types of emergencies, and the emergency message signal generator actuates the numeral signal generator in response to the sensor to produce coded messages indicating the type of alarm existing.

8. In an automatic alarm signaling system, a transmitter adapted for reporting to a called station a predetermined condition through a central telephone exchange over a telephone line which includes a local telephone instrument, said transmitter comprising:

means responsive to the occurrence of the predetermined condition for seizing the telephone line, disconnecting therefrom the local telephone instrument, and connecting said transmitter to the telephone line;

a generator for producing telephone station calling signals;

a generator for producing message signals;

means responsive to the reception of a dial tone for causing said telephone station calling signal generator to transmit station calling signals over the telephone line to cause the central exchange to connect said transmitter to the called station;

means responsive to a first signal transmitted by the called station for causing said message signal generator to transmit message signals over the telephone line; and disconnecting means responsive to a second signal transmitted by the called station to disconnect said alarm signaling system from the telephone line and reconnect the local telephone instrument to the telephone line.

9. In an automatic alarm signaling system, a transmitter adapted for reporting the occurrence of a predetermined condition at a local station to a called station over a telephone line through a central telephone exchange, the telephone line being adapted for coupling to a local telephone instrument, said transmitter comprising:

a multi-frequency oscillator for generating coded signals including telephone station calling signals and normally connected to said telephone line, said oscillator adapted to be alternatively connected to said local telephone instrument and said transmitter;

line control apparatus operative in response to the occurrence of a predetermined condition to disconnect the local telephone instrument from the telephone line and to connect said oscillator and said telephone line to said transmitter;

means responsive to a dial tone transmitted by the central telephone exchange for producing a first actuating signal;

means responsive to said first actuating signal for producing a first plurality of signals in a predetermined sequence;

means responsive to said first plurality of signals for generating a first plurality of multi-pulse signals, said oscillator being operative in response to said first plurality of multi-pulse signals to transmit over the telephone line, multi-frequency telephone station calling signals corresponding to the number of the called station;

means operative in response to a first signal transmitted over the telephone line by the called station after said transmitter is connected to said called station for producing a second actuating signal;

means responsive to said second actuating signal for producing a second plurality of signals in a predetermined sequence;

said multi-pulse signal generating means being responsive to said second plurality of signals for generating a second plurality of multi-pulse signals, said oscillator being operative in response to said second plurality of multi-pulse signals to transmit multi-frequency message signals over the telephone line; and means responsive to a second signal transmitted over the telephone line by the called station after receipt of said message signals for producing a third actuating signal;

said line control apparatus being operative in response to said third actuating signal to disconnect said transmitter from the telephone line and to reconnect said oscillator to the local telephone instrument.

10. The transmitter recited in claim 9 wherein said line control apparatus includes:

means operative upon the occurrence of said predetermined condition to disconnect the local telephone instrument from the telephone line and to connect said oscillator to said transmitter;

means for connecting said transmitter to the telephone line a predetermined time after the occurrence of said predetermined condition and for maintaining said connection for a first period of time in the absence of said third actuating signals; and means for reconnecting said local telephone instrument to said telephone line and said oscillator for a second period of time and thereafter again disconnecting said local telephone instrument from said telephone line and connecting said oscillator to said transmitter.

11. The transmitter recited in claim 9, wherein:

said means for producing a first plurality of signals comprises a first plurality of electronic digit switches arranged to operate sequentially at a predetermined rate.

12. The transmitter recited in claim 11, and further comprising:

means operative a predetermined time after the absence of said first actuating signal to reset said first plurality of digit switches, and to enable said transmitter to recycle in response to a dial tone again transmitted by the central telephone exchange.

13. The transmitter recited in claim 12, wherein:

said means for producing a second plurality of signals comprises a second plurality of electronic digit switches arranged to operate sequentially at a predetermined rate.

14. The transmitter recited in claim 13 and further comprising:

means operative upon completion of said sequence of second plurality of signals to reset said second plurality of digit switches and operative a predetermined time after the absence of said third actuating signal to recycle said means for producing a second plurality of signals.

15. The transmitter recited in claim 9 and further comprising:

means responsive to a busy signal transmitted by the central telephone exchange over the telephone line for opening said telephone line for a predetermined period of time and thereafter closing the telephone line thereby to enable said transmitter to recycle in response to a received dial tone.

16. The transmitter recited in claim 14 wherein:

said multi-pulse signal generating means comprises:

a plurality of pulse generating means selectively actuated by each of the signals of said first and second plurality of signals;

a like plurality of bistable devices, each connected to the output of one of said pulse generating means and each adapted to produce an output in response to a signal from its respective pulse generating means; and a plurality of gates selectively connected to the outputs of said bistable devices and operative to selectively produce unique signal pairs in response to each of the signals of said first and second plurality of signals, said signal pairs being adapted to be applied to said multi-frequency oscillator to cause said oscillator to produce selected dual frequency signals for transmission over the telephone line.

17. The transmitter recited in claim 14, wherein:

said multi-pulse signal generating means comprises:

a plurality of pulse transformers selectively actuated by each of the signals of said first and second plurality of signals;

a like plurality of bistable devices, each connected to the output of one of said pulse transformers and each adapted to produce an output in response to a signal from its respective pulse transformer; and a plurality of gates selectively connected to the outputs of said bistable devices and operative to selectively product unique signal pairs in response to each of the signals of said first and second plurality of signals, said signal pairs being adapted to be applied to said multi-frequency oscillator to cause said oscillator to produce selected dual frequency signals for transmission over the telephone line.

References Cited

UNITED STATES PATENTS

| | | | |
|---|---|---|---|
| 3,299,211 | 1/1967 | Avery | 179—5 |
| 3,427,403 | 2/1969 | Stokes | 179—5 |

RALPH D. BLAKESLEE, Primary Examiner

Disclaimer 3,527,892.—*Jurgen Kok*, Bedford, Mass. AUTOMATIC ALARM TRANSMITTING SYSTEM. Patent dated Sept. 8, 1970. Disclaimer filed Dec. 7, 1972, by the assignee, *DASA Corporation*, consenting.

Hereby enters this disclaimer to claims 1 and 2 of said patent.

[*Official Gazette March 6, 1973.*]